United States Patent [19]

Yamaguchi et al.

[11] 4,319,480
[45] Mar. 16, 1982

[54] KNOCK DETECTOR DEVICE FOR INTERNAL COMBUSTION ENGINES

[75] Inventors: Hiroaki Yamaguchi, Anjo; Tadashi Hattori; Yoshinori Ootsuka, both of Okazaki, all of Japan

[73] Assignee: Nippon Soken, Inc., Nishio, Japan

[21] Appl. No.: 168,166

[22] Filed: Jul. 14, 1980

[30] Foreign Application Priority Data

Jul. 16, 1979 [JP] Japan .................................. 54-90859

[51] Int. Cl.³ .............................................. G01L 23/22
[52] U.S. Cl. ...................................................... 73/35
[58] Field of Search ................... 73/35, 593, 651, 654; 123/425, 435

[56] References Cited

U.S. PATENT DOCUMENTS 4,012,942  3/1977  Harned ................................... 73/35
4,111,035  9/1978  West et al. ............................ 73/35

Primary Examiner—James J. Gill
Attorney, Agent, or Firm—Cushman, Darby & Cushman

[57] ABSTRACT

A knock detector device for internal combustion engines comprises a first sensor for sensing the vibrations of an engine within its knocking frequency range, a second sensor for sensing the vibrations of the engine irrespective of the engine knocking frequencies, and a noise suppressing circuit for eliminating the noise in the output signal of the first sensor by means of the output signal of the second sensor.

9 Claims, 11 Drawing Figures

KNOCK DETECTOR DEVICE FOR INTERNAL COMBUSTION ENGINES

The present invention relates to a knock detector device for use with internal combustion engine ignition timing control systems, which is designed to function so that knocking is detected from the vibrations produced outside the engine cylinders due to the cylinder pressure and the ignition timing is controlled so as to obtain the desired knock intensity.

It is well known in the art that there is a close correlation between the timing of ignition and the cylinder pressure. When a mixture is exploded, in the absence of knock there is no superposition on the cylinder pressure of any higher harmonics (usually a frequency component in the frequency range which is determined by the engine cylinder bore diameter and the velocity of sound in the combustion and it is caused by the intermittent and rapid combustion), whereas when knocking occurs such higher harmonic component starts to superpose on the cylinder pressure at around the maximum cylinder pressure and this results in the production of vibrations outside the cylinders. Examination of the pressure signals produced inside the cylinders and the vibrations or sound emitted to the outside of the cylinders indicates that the beginning of knock (trace knock) starts to occur at an engine crank angle at which the cylinder pressure attains the maximum value and that as the knocking increases in intensity gradually (to light knock and heavy knock) the higher harmonic component starts to superpose on the cylinder pressure considerably earlier (or on the ignition side) than the maximum cylinder pressure value crank angle. It has been considered that the frequency of such higher harmonic component due to knocking is linearly determined by the cylinder bore diameter and the sound velocity in the combustion as mentioned previously and the frequency is generated in a particular frequency band (usually in the range of 7 to 10 kHZ). Thus, in the case of known detecting apparatus, the ignition timing is controlled by simply detecting the vibrations emitted to the outside of an engine or by detecting knocking of the engine on the ground that it would be possible to detect the knock by noting only such a particular frequency. However, the known detecting apparatus have been found that their detection accuracy tends to deteriorates depending on the operating conditions of an engine and there are certain operating conditions where the detection of very weak knocking or trace knock is difficult. More specifically, if knocking is detected in the range of 7 to 10 kHZ, at high engine speeds the vibration noise produced in the engine body (e.g., the vibration due to valve seating) is increased with the resulting deterioration of the S/N ratio. In particular, the effect of such vibration noise is so large under high speed and high load conditions that the detection of trace knock is practically impossible.

On the other hand, if an attempt is dared to control the ignition timing despite the deteriorated S/N ratio, it will tend to cause an excessively large knocking and in certain cases damages to the engine body including melting loss of the spark plugs will be caused. To prevent such damages, generally it is unavoidable to stop the ignition timing control under high speed and high load conditions. If any attempt is made to simply detect the vibrations without noting any particular frequency band, the effect of vibration noise would be so large that it is practically impossible to detect trace knock, making it impossible to ensure a smooth control.

The results of various investigations have shown that if, instead of simply detecting knocking, both of knocking and background noise are detected and compared for the purpose of determining the occurrence of knocking, it is possible to detect the occurrence of knock with improved accuracy even at high speed operation where the magnitude of generated background noise is high.

FIG. 1 shows the results of the frequency analysis performed on the vibration outputs generated at different engine speeds from a piezoelectric element type vibration detector mounted to the cylinder block of an engine and having substantially a flat detection characteristic for the range of vibration frequencies f between 0 and 15 to 20 kHZ so as to examine the variations in the magnitude of the background noise.

In the Figure, indicated at A and B are the vibration outputs produced respectively at the engine speed of 1500 rpm and 3000 rpm under high load (WOT) nonknocking conditions. As will be seen from the Figure, in the frequency band (5 to 10 kHZ) where knock occurs the background noise tends to occur and this tendency substantially increases in proportion to the engine speed. In other words, under high speed and high load conditions the knocking signal is overwhelmed by noise and thus the S/N ratio is deteriorated, making it difficult to detect the weak signal. The detection of such knock signal is basically difficult so that it is not sufficient to detect the presence or intensity of knock by simply adjusting the resonant system of a resonance type detector to operate within a frequency band in which knock is present and comparing the output of the detector with a predetermined comparison level, giving rise to the following problems.

(1) From the control point of view it it desirable that knocking is detected at a constant level irrespective of the operating conditions of an engine. However, since the detector output represents the detection of a composite signal of a knock signal and background noise, if a preset constant comparison level is used, the detection level of knock will be dependent on the engine operating conditions. The comparison level for controlling purposes is established high enough in consideration of background noise so as to detect knock under as wide engine operating conditions as possible. As a result, at low engine speeds the comparison level will not be reached until the level of knock becomes sufficiently high thus detecting the knock only at a high level, whereas at high engine speeds noise will be added to knock thus detecting a low level of knock. More specifically, when the engine speed and load increase so that noise increases, the knock detection level is changed to a lower value (a light knock level) and simultaneously the tolerance for background noise is lost, thus tending to cause malfunction and making it impossible to detect a predetermined knock.

(2) The linear detection of knock intensities is also difficult due to impossibility of separating noise from the knock signal. Thus, for the same knock level, at low engine speeds the knock is detected and discriminated at a value lower than the actual level, whereas at high speed and load condition, due to increased noise, the knock is detected and discriminated at a value higher than the actual level.

(3) At high speed operation noise increases excessively so that the knock signal tends to be overwhelmed by the noise and the tolerance for the S/N ratio is decreased, making the detection of knock more difficult and tending to cause a system malfunction.

SUMMARY OF THE INVENTION

With a view to overcoming the foregoing deficiencies in the prior art, it is the object of the present invention to provide an improved knock detector device for internal combustion engines comprising a first sensor having a resonance characteristic within that range of frequencies where knock occurs and a second sensor having substantially a flat sensitivity characteristic within the knocking frequency range for detecting vibration noise so as to effect simultaneous detection of knock and noise, whereby the detection and discrimination of knock are effected after the knock output from the first sensor has been corrected by or compared with the background noise sensed by the second to eliminate the effects of the background noise, so that even of the background noise varies, the detecting apparatus is always not subjected to the effect of noise and the detection of even very weak knock can be safely accomplished under all the engine operating conditions, thus eliminating the deficiencies in the prior art, such as, inability of knock detection at high engine speeds due to background noise and hence inability to control the ignition timing, danger of causing melting loss of the spark plugs and sometimes damages to the engine body due to an attempt to control the ignition timing under such conditions where only the detection of knock of relatively high level (heavy knock) is possible due to the deteriorated S/N ratio, and inability to effect smooth control of the knocking at high load and speed operation where the greatest improvement of the fuel consumption and engine efficiency can be expected, and greatly improving the engine durability and efficiency.

DESCRIPTION OF THE PREFERRED EMBODIMENTS

The present invention will now be described in greater detail with reference to the illustrated embodiments.

Figure 1:
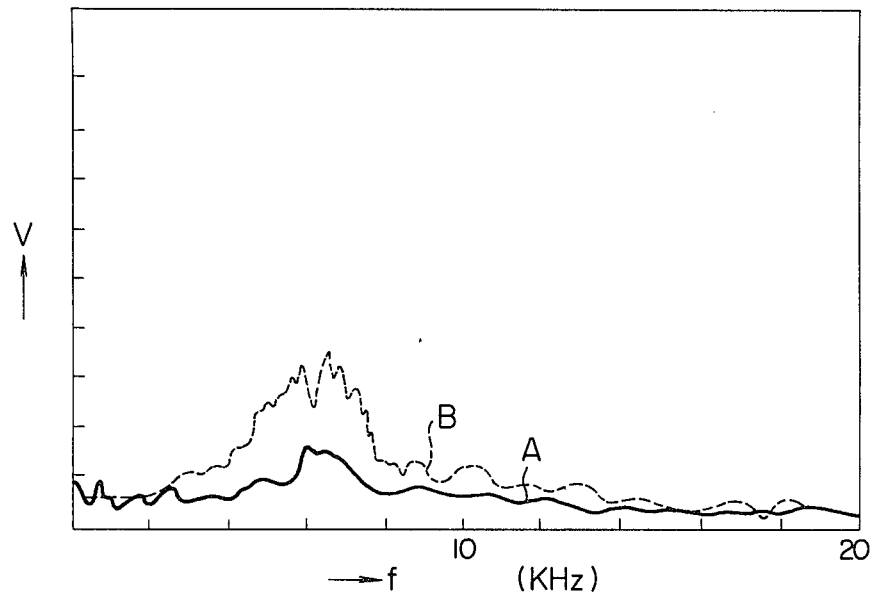
FIG. 1 is a vibration frequency characteristic diagram of an engine under nonknocking conditions.
Figure 2:
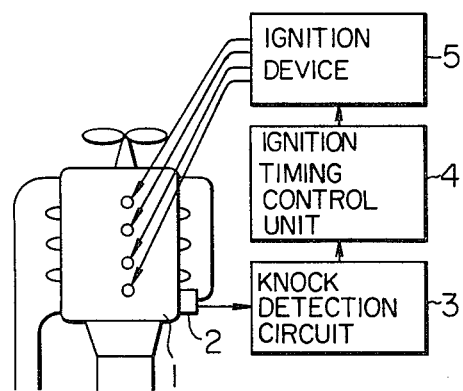
FIG. 2 is a block diagram of a knock feedback ignition system incorporating a knock detecting apparatus according to the present invention.

Referring now to FIG. 2, there is illustrated a schematic block diagram of a knock feedback ignition system incorporating a knock detector device according to the present invention. In the Figure, numeral 1 designates a four-cylinder inline type internal combustion engine, and a knock detecting apparatus 2 having a predetermined resonance characteristic is firmly attached by means of a screw or the like to the cylinder block of the engine 1 (on the No. 4 cylinder side in the illustration). Numeral 3 designates a knock detecting circuit for detecting knocking of the engine 1 from the output signal of the knock detecting apparatus 2, and 4 an ignition timing control unit responsive to the output of the detecting circuit 3 to advance or retard the ignition timing into the optimum position. The output signal of the control unit 4 is used to ignite the air-fuel mixture through a known type of ignition device 5 and the spark plugs mounted in the engine 1. The knock detecting circuit 3 used in this system detects the ignition signal which is not shown, whereby during a predetermined time interval or a predetermined number of crank angle degrees immediately following the ignition where there is no occurrence of knock, the noise component due to the engine vibration is sampled by means of the output of the detecting apparatus 2 and the result obtained is compared with the output (or its integrated or average value may sometime be used) of the detecting apparatus produced during a predetermined time interval or predetermined degrees of crankshaft rotation following the top dead center or TDC (after the peak cylinder pressure), thereby detecting the presence of knock. Alternatively, the presence of knock may be determined by a probability process instead of depending on a single signal. For instance, the presence of knock may be determined on the basis of the percentage of knocking events in every 100 times of ignition. The ignition timing control unit 4 advances or retards the ignition timing in accordance with the presence or absence of knock. The detector device of the present invention can be used with the ignition timing control unit 4 irrespective of its type so long as it controls the ignition timing and therefore the control unit 4 will not be described in detail. For the same reasons, the knock detecting circuit 3 will be described in detail only with respect to its construction which is especially associated with the objective of the present invention.

Figure 3:
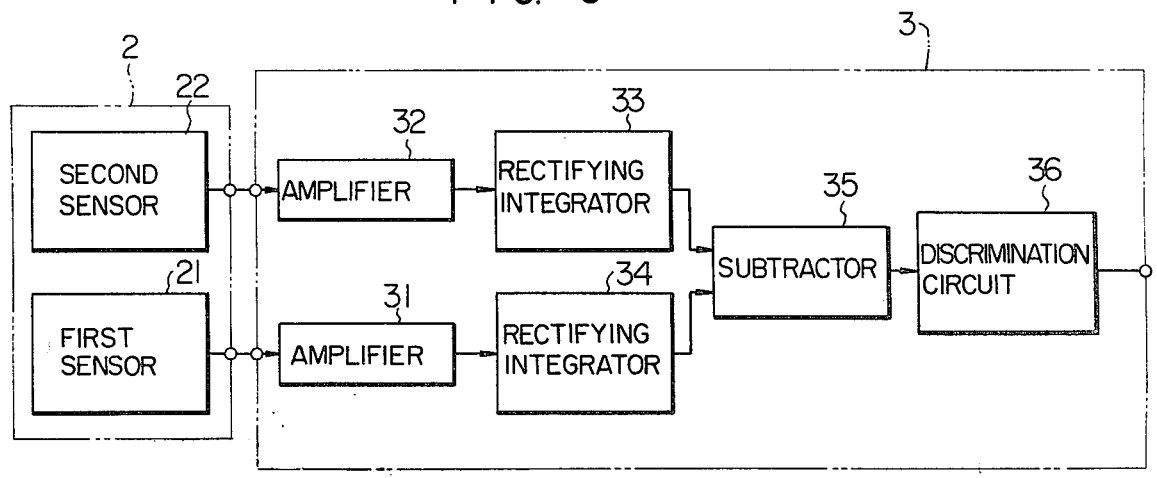
FIG. 3 is a block diagram showing in detail principal parts of the system shown in FIG. 2.
Figure 5A:
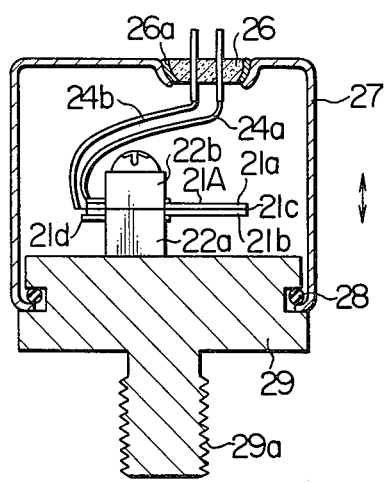
FIGS. 5A to 5D show an embodiment of the knock detector device according to the invention, with FIG. 5A showing its longitudinal sectional view, FIG. 5B its cross-sectional view, FIG. 5C its principal longitudinal sectional view and FIG. 5D its principal enlarged longitudinal sectional view.
Figure 5B:
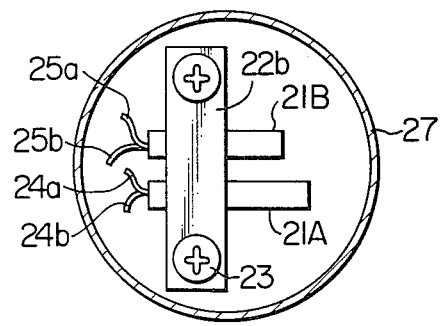
Figure 5C:
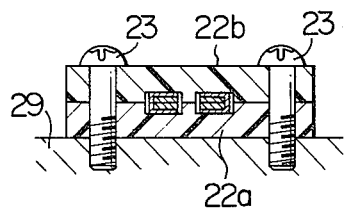
Figure 5D:
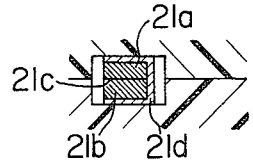

FIG. 3 is a block diagram of the input processing section of the knock detecting circuit 3. In the Figure, numeral 2 designates the knock detecting apparatus comprising a first sensor 21 having a resonance characteristic within a range of frequencies where knock occurs and a second sensor 22 having a resonance characteristic within a frequency range higher than the knocking frequency range and a sensitivity characteristic which is substantially flat with respect to the knocking frequency range. Numeral 3 designates the knock detecting circuit connected to the knock detecting apparatus 2, 31 and 32 amplifiers for amplifying the outputs of the first and second sensors 21 and 22, and 33 and 34 rectifying integrators adapted to half-wave or full-wave rectify and integrate the outputs of the amplifiers 31 and 32 for converting the same into analog voltages. Numeral 35 designates a subtractor (which may be comprised of a simple differential amplifier) for receiving the outputs of the rectifying integrators 33 and 34 to subtract the output of the integrator 33 indicative of the vibration noise component from the knock signal (including the vibration noise component) from the integrator 34. Numeral 36 designates a discrimination circuit for knock discriminating purposes, which is designed so that the presence of knock is determined by sampling the knock for a predetermined time interval or degrees of crankshaft rotation in response to a crank angle signal or timing signal which is not shown. Alternatively, the presence of knock may be determined in accordance with the rate of occurrence of knocking events. The discrimination circuit 36 of any construction can be used satisfactorily with the apparatus of this invention and thus it will not be described in detail.

Figure 4:
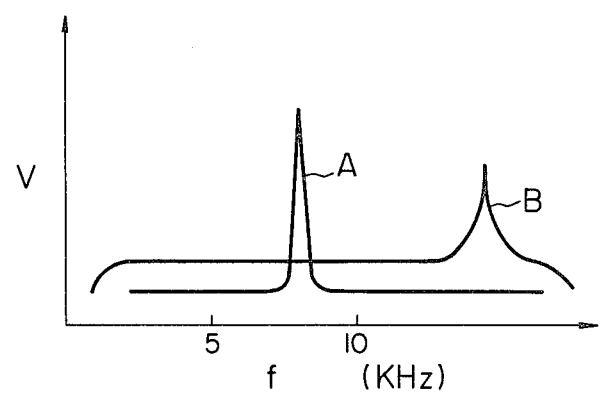
FIG. 4 is a diagram showing by way of example a frequency characteristic of the knock detector device according to the present invention.

FIG. 4 shows the vibration characteristics of the first and second sensors 21 and 22, with f on the abscissa representing the vibration frequency v on the ordinate representing the output voltage level.

Symbol A designates the frequency characteristics of the first sensor 21 whose resonance characteristic is within the knocking frequency range, and B the frequency characteristic of the second sensor 22 whose resonance characteristic is selected higher than the knocking frequency band so that it is resonant at a frequency which is sufficiently different from the knocking frequency range so as to detect only the vibration noise.

As a result, the outputs of the sensors 21 and 22 are such that the characteristic A represents the knock signal including the vibration noise and the characteristic B detects the vibration noise due to the seating of the valves in the engine and the like.

In operation, the sensors 21 and 22 of FIG. 3 each generates an alternating high frequency signal in response to the vibrations due to knocking so that the signals are respectively rectified by the amplifiers 31 and 32 (e.g., high impedance type amplifiers called as charge amplifiers when used with piezoelectric elements), converted into analog voltages by the rectifying integrators 33 and 34 and then applied to the subtractor 35 which in turn subtracts the output of the rectifying integrator 33 or the noise component from the knocking vibration output of the rectifying integrator 34 including the vibration noise component. As a result, the deficiencies of the prior art apparatus due to the use of a single vibration sensor irrespective of its being resonant or nonresonant type, that is, inability to separate the vibration noise from the vibrations due to knock, difficulty to detect very weak knock at high speed operation or high load operation, inability to detect knocking at a fixed intensity and so on can be eliminated and a satisfactory knock detecting capacity is ensured under all the engine operating conditions.

Specific constructions of the detecting apparatus 2 will now be described. The essential requirement for the detecting apparatus 2 is that it comprises at least two sensors having different characteristics. As a result, while the sensors need not be especially constructed as a single unit so long as they have the previously mentioned detecting characteristics, there is the possibility of causing difference in sensitivity between the sensors depending on their mounting positions and thus it is desirable and also inexpensive to place the sensors within the same case. Thus, exemplary constructions in which two sensors are arranged within the same case will now be described.

FIGS. 5A to 5D show a first embodiment of the knock detector device employing piezoelectric elements. The first and second sensors 21 and 22 consist of piezoelectric vibration sensing elements 21A and 21B. Each of the sensing elements 21A and 21B is of the plate type which is called as the Bimorph type (although it may be of the bar type) comprising two piezoelectric plates 21a and 21b which are connected together by adhesive with a center electrode 21c held therebetween, and the vibration sensing elements 21A and 21B are held, together with outer electrodes 21d interconnecting the upper and lower piezoelectric plates 21a and 21b, between two recessed insulators 22a and 22b each made of ceramic or bakelite and they are then firmly attached to a metal stay 29 by screws 23.

The signals from the vibration sensing elements 21A and 21B are taken out through the center electrodes 21c and the end of the outer electrodes 21d, through lead wires 24a, 24b and 25a, 25b which are connected to the elements by soldering or caulking and through the respective electrodes of a sealing terminal 26 (usually called as a hermetic seal) in which its four electrodes are insulated by glass. The terminal 26 is soldered to a metal cover 27 by means of a metal housing 26a, and the cover 27 is attached, along with a sealing member 28 made of rubber or the like, to the stay 29 by caulking the end of the cover 27. The lower part of the stay 29 includes a fastening threaded portion 29a and the stay 29 is firmly fastened to the engine cylinder block by means of the threaded portion 29a. The sensing direction of the detecting apparatus 2 is in the vertical directed indicated by the arrow. Since the vibration sensing elements 21A and 21B are identical in material and construction with each other, their resonant frequencies are determined by their lengths. In the Figure, the shorter vibration sensing element 21B has no resonant frequency falling within the knocking frequency range and it corresponds to the second sensor 22 which is resonant at a frequency (e.g., 15 kHZ or over) negligibly higher than the knocking frequency bands (e.g., 7 to 10 kHZ and 11 to 13 kHZ). The longer vibration sensing element 21A corresponds to the first sensor 21 whose resonance frequency (e.g., 8 kHZ) is within the knocking frequency band. The vibration sensing elements 21A and 21B are fully insulated from each other and each of the elements is capable of generating a signal independently of the other.

The operation of the detecting apparatus 2 is as follows. When the engine having the detecting apparatus 2 attached to the cylinder block is operated, force is applied to the vibration sensing elements 21A and 21B in the directions indicated by the arrow and each of them generates an output corresponding to the force. Since the vibration sensing elements 21A and 21B are electrically independently of each other, the vibration sensing element 21A responds to knock with a high sensitivity and the other vibration sensing element 21B responds to noise. The outputs of the vibration sensing elements 21A and 21B are applied independently of each other to the previously mentioned knock detecting circuit 3 of FIG. 3 so that correction is provided in accordance with the occurrence of engine vibration noise and the vibration noise is suppressed as far as possible, thus detecting even a very weak knock.

As a result, the deficiencies which have been encountered in the prior art, that is, variation of the knock detection level due to the engine vibration noise as well as the inability to detect the knock due to the increased noise particularly at high speed and load operation and the like are eliminated and a satisfactory detection of knock is ensured under all the engine operating conditions.

Next, the difference in output sensitivity between the sensors will be described. The use of the two sensors tends to cause a difference in sensitivity between the sensors due to the different vibration conditions. While the sensitivities of the sensors are generally adjusted by varying the amplification factors of the amplifiers 31 and 32, in the below-mentioned modification the sensitivity adjustment is effected within the sensors.

While, in the embodiment of FIG. 5, the vibration sensing elements 21A and 21B are comprised of the piezoelectric units which are identical in material, width and thickness but are different in length, in order to vary the sensitivity of the piezoelelectric units, if the piezoelectric units are of the same material, the thickness (volume) or the width (area) of the vibrating members may be increased to increase the sensitivity. In this case, the sensitivity is increased by increasing the width which has no effect on the resonance characteristic while maintaining the thickness and length constant. This makes it possible to determine the sensitivity correction of the sensors simply on the basis of the width (area ratio) with the resulting simplification of their designing and adjustment.

Figure 6A:
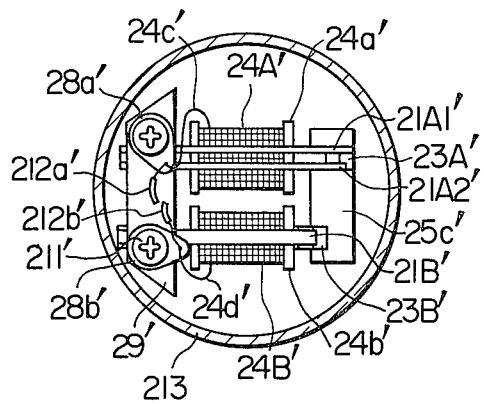
FIGS. 6A and 6B are respectively a cross-sectional view and longitudinal sectional view showing a second embodiment of the knock detector device according to the present invention.
Figure 6B:
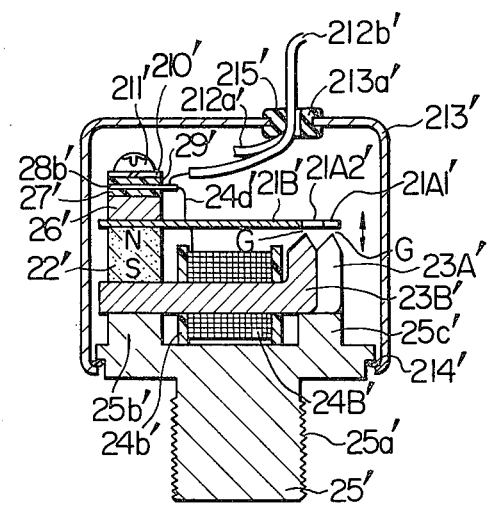

Next, a second embodiment of the detecting apparatus 2 adapted to detect knock magnetically will be described. Referring to FIGS. 6A and 6B showing the construction of the second embodiment, numerals $21A_1'$ and $21A_2'$ designate magnetic vibrating members (hereinafter referred to as reed members) in flat plate form (may also be formed into bar shape) which are each made of iron or iron-nickel alloy and having a resonance characteristic within a knocking frequency band and these reed members $21A_1'$ and $21A_2'$ are prepared by forming a single magnetic plate with furrows and ridges and then dividing the end portion into two parts. Numeral 21B' is a similar vibrating member (hereinafter also referred to as a reed member) in flat plate form (may also be formed into bar shape) which is made of iron, iron-nickel alloy or the like and having a resonance characteristic within a frequency band above the knocking frequency bands so as to detect vibration noise from the engine body. If necessary, the reed members $21A_1'$, $21A_2'$ and 21B' are subjected to nickel plating. Numeral 22' designates a magnet having a magnetic force, and 23A' and 23B' cores made of a magnetic material such as iron, iron-nickel alloy or ferrite and arranged respectively to form a magnetic path with the reed members $21A_1'$ and $21A_2'$ and the magnet 22 and with the reed member 21B' and the magnet 22.

These magnetic paths include air gaps G which are provided respectively between the reed members $21A_1'$ and $21A_2'$ and the core 23A' and between the reed member 21B' and the core 23B'. When the vibrating reeds $21A_1'$, $21A_2'$ and 21B' vibrate in the directions indicated by the arrow, the gaps are varied so that the magnetic reluctances of the magnetic paths are varied and the magnetic fluxus are varied. Numerals 24A' and 24B' designate coils for detecting magnetic flux changes. Coil bobbins 24a' and 24b' are formed with holes through their center portions so that the cores 23A' and 23B' are extended through the holes, and the coil conductors are wound on the outer surfaces of the bobbins 24a' and 24b'. To prevent the magnetic flux passing through the magnetic paths from being changed due to a change in the relative position of the coil 24A' and the core 23A' and of the coil 24B' and the core 23B', respectively, the cores 23A' and 23B' are respectively fastened to the bobbins 24a' and 24b' by adhesion or the like. Numeral 25' designates a stay made of iron, brass or the like and including in the lower part a threaded portion 25a' for attaching the detecting apparatus to the engine cylinder block and in the upper part supporting portions 25b' and 25c' on which are mounted the cores 23A' and 23B'. Numeral 26' designates a keep bar for holding the magnetic path forming components in place. The keep bar 26' is firmly secured, along with insulators 27' and 29', lug pieces 28a' and 28b' to which one output terminals 24c' and 24d' are attached and a washer 210', to the supporting portion 25b' of the stay 25' by screws 211'. The one output terminals 24c' and 24d' of the coils 24A' and 24B' are respectively fastened to the lug pieces 28a' and 28b' by soldering, caulking or the like and then brought out by way of lead wires 212a' and 212b'. The other output terminals of the coils 24A' and 24B' are connected to the stay 25' so as to be grounded therethrough. Numeral 213' designates a cover mounted by caulking on the stay 25' with a sealing member 214' of rubber or the like being inserted therebetween. The cover 213' is formed with a hole 213a' through which the lead wires 212a' and 212b' are brought to the outside. Numeral 215' designates a rubber bushing for holding the lead wires 212a' and 212b' in plate. The vibration sensors formed by the reed members $21A_1'$, $21A_2'$ and 21B', the coils 24A' and 24B', etc., can vary the length of the reed members $21A_1'$, $21A_2'$ and 21B' so as to determine their resonance frequency characteristics in dependence on the length of the reed members. The resulting vibration characteristics are substantially the same with those of the first embodiment, but the reed members $21A_1'$ and $21A_2'$ have different resonance characteristics within the same knocking frequency band and are operable independently of each other. This provides two resonant frequencies within the same knocking frequency band so that knock is detected at the different frequencies and the knock detecting probability of the detecting apparatus on the whole is improved. By screwing the threaded portion 25a' into the cylinder block, the detecting apparatus is firmly secured to the cylinder block so that the entire detecting apparatus vibrates along with the cylinder block.

With the embodiment of FIG. 6, the vibrations produced in the cylinder block by knocking are transmitted to the reed members $21A_1'$, $21A_2'$ and 21B' by way of the stay 25'. The reed members $21A_1'$, $21A_2'$ and 21B' vibrate in accordance with the frequency and magnitude of the vibrations as well as the natural frequencies of the reed members themselves. In this case, the cores 23A' and 23B', the coils 24A' and 24B' and the magnet 22' are firmly mounted in place so as to vibrate along with the stay 25', so that only the reed members $21A_1'$, $21A_2'$ and 21B' vibrate relatively in the magnetic paths in response to the knock-induced vibrations and the distance of the gaps G varies in accordance with the knock. It is designed so that a predetermined magnetic flux is supplied by the magnet 22' to the cores 23A' and 23B' and the reed members $21A_1'$, $21A_2'$ and 21B' and a change in the gap G results in a change of the magnetic flux passing through the magnetic path. The coils 24A' and 24B' each detects a change in the magnetic flux or the vibrations due to knock as a voltage. The detected voltage signals are supplied to the knock detecting circuit 3 through the lead wires 212a' and 212b'. The reed members 21A' and 21B' are designed so that they have different lengths and hence different resonance frequencies with respect to the knocking frequency band (7 to 10 kHZ or 11 to 13 kHZ), that is, usually two different resonance frequencies about 8 kHZ or 12 kHZ (or two different resonance frequencies of 8 and 12 kHZ may be selected). Thus, the knock detecting sensitivity of the detecting apparatus is especially improved within the knocking frequency band and the sensitivity to signals of other frequency bands is deteriorated, thus improving the S/N ratio. On the other hand, the reed member 21B' has a resonance frequency (15 kHZ or over) which is higher than the knocking frequencies. The sensor sensivility to those frequencies below the resonance frequency shows substantially a flat characteristic, thus providing satisfactory compensation for the effects of engine vibration noise. Further, due to the detection of magnetic flux changes by the detecting coils 24A' and 24B', the output impedence can be reduced and the resistance to humidity and contamination and noise suppressing efficiency are also improved over the piezoelectric type detecting apparatus.

Figure 7:
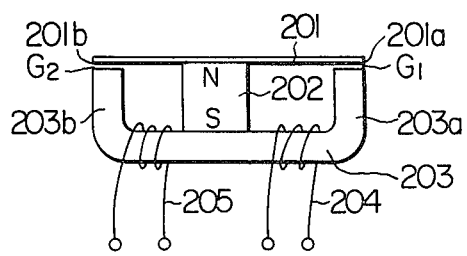
FIG. 7 is a front view showing schematically the construction of a principal part of a third embodiment of the knock detector device according to the invention.

Another embodiment of the magnetic detection type will now be described. While, in the above-described second embodiment, a single magnet, three reed members and two cores are used to form two sensors which are arranged in parallel with each other, any other type of detecting apparatus may be used so long as the required magnetic paths are provided. FIG. 7 is a schematic diagram showing a third embodiment of the detecting apparatus 2 in which two magnetic paths are provided in opposite positions. Numeral 201 designates a reed member corresponding to the previously mentioned reed members with resonance frequencies and including air gaps $G_1$ and $G_2$ on the opposite sides thereof. The reed member 201 may be comprised of a single plate or there will be no problem even if it is divided into two parts provided that the parts are firmly mounted in place. Numeral 202 designates a magnet, and 203 a C-shaped core made of a magnetic material. One magnetic flux flows through a path including the north pole of the magnet 202, one side 201a of the reed member 201, the gap $G_1$ and one side 203a of the core 203, and the other magnetic flux flows through another path including the north pole of the magnet 202, the other side 201b of the reed member 201, the gap $G_2$ and the other side 203b of the core 203. Numerals 204 and 205 designate coils wound on the core 203 in the two magnetic paths. Also in this case, the resonance frequencies can be varied by varying the length of the left and right sides of the reed member 201 and it is only necessary to select so that one of the resonance frequency falls within the knocking frequency range and the other resonance frequency is outside the knocking frequency range.

In the second and third embodiments described above, the difference in sensitivity between the sensors is adjusted by varying the number of turns in the sensing coils (knock sensing coil < vibration noise sensing coil), varying the resistance value of the magnetic paths, varying the width of the gaps or the like, and the output voltage decreases with an increase in the gap width which is usually on the order of 0.1 to 1 mm. Of these measures, the method of varying the number of coil turns and the method of varying the gap width are easier in adjustment than the others.

In addition to the foregoing, all that is required for the knock detector device of this invention is the fact that the device is provided with at least two different sensors with different vibration characteristics, one for sensing noise and the other for sensing knock, and the two sensors need not be of the same construction (for example, a combination of a piezoelectric type and a magnetic detection type may be used). However, the provision of two sensors which are different in principle tends to cause an increase in the cost.

Further, the detection method need not to be limited to the previously mentioned two types and it is possible to use any other type of detection, such as, a photoelectric type (a method in which the vibrations of vibrating members are detected in response to the transmission or reflection of light).

Still further, the sensing coils used in the second and third embodiments may be replaced by any other elements so long as these elements are capable of sensing a change in the magnetic flux, and also magneto-resistance elements, Hall generating elements or the like may be used.

Still further, while, in the second embodiments, the reed member is provided by forming a magnetic plate with furrows and ridges and then dividing its end into two parts so as to be resonant at two frequencies within a frequency band or bands where knock occurs, the vibrating member may be comprised of a round or square bar member and it is required only to be of such shape which responds to vibrations. Thus the vibrating member is in no way limited by the properties of magnetic material and shape.

We claim:

1. A knock detector device for internal combustion engines comprising:
   first sensing means having at least one resonance characteristic within a knocking frequency range of an engine and disposed to sense vibrations of said engine to generate an output signal;
   second sensing means having no resonance characteristic within said engine knocking frequency range and disposed to sense vibrations of said engine to generate an output signal; and
   a noise suppressing circuit disposed to receive the output signals of said first and second sensing means such that a noise component contained in the output signal of said first sensing means is eliminated by the output signal of said second sensing means.

2. A device as set forth in claim 1, wherein said noise suppressing circuit subtracts the output signal of said second sensing means from the output signal of said first sensing means.

3. A device as set forth in claim 1 or 2, wherein said first and second sensing means are disposed within the same case.

4. A device as set forth in claim 1 or 2, wherein each of said first and second sensing means includes piezoelectric type vibration sensing means in bar or plate form.

5. A device as set forth in claim 4, wherein said piezoelectric type vibration sensing means are different in width so as to correct the sensitivities thereof with respect to each other.

6. A device as set forth in claim 1 or 2, wherein each of said first and second sensing means comprises magnetic path means including magnetic vibrating means in bar or plate form, and magnetic sensing means for sensing a change in the magnetic reluctance of said magnetic path means due to the vibration of said magnetic vibrating means.

7. A device as set forth in claim 6, wherein said magnetic sensing means includes a coil wound on said magnetic path means.

8. A device as set forth in claim 7, wherein said first and second sensing means are different in the magnetic reluctance of said magnetic path means so as to correct the sensitivities thereof with respect to each other.

9. A device as set forth in claim 7, wherein said first and second sensing means are different in the number of turns of said coils so as to correct the sensitivities thereof with respect to each other.

* * * * *